United States Patent [19]

Harris

[11] Patent Number: 4,685,584
[45] Date of Patent: Aug. 11, 1987

[54] VENTED FUEL CAP WITH BUMP AND GRADE SEAL

[75] Inventor: Robert S. Harris, Connersville, Ind.

[73] Assignee: Stant Inc., Connersville, Ind.

[21] Appl. No.: 912,804

[22] Filed: Sep. 29, 1986

[51] Int. Cl.$^4$ .............................................. B65D 51/16
[52] U.S. Cl. ............................ 220/204; 220/DIG. 33; 137/39; 137/43; 137/73
[58] Field of Search ................ 220/204, 202, 203, 303, 220/210, 367, 368, 373, 374, DIG. 33; 137/493.8, 39, 43, 73

[56] References Cited

U.S. PATENT DOCUMENTS

| | | | |
|---|---|---|---|
| 3,757,987 | 9/1973 | Marshall | 220/204 |
| 4,337,873 | 7/1982 | Johnson | 220/204 |
| 4,494,673 | 1/1985 | Hiraishi | 220/DIG. 33 |
| 4,512,499 | 4/1985 | Uvskallio | 220/367 |

Primary Examiner—George T. Hall
Attorney, Agent, or Firm—Barnes & Thornburg

[57] ABSTRACT

A fuel cap for closing the filler neck of an off-road vehicle. The fuel cap includes a cover having an opening therethrough and a concentric housing extending downwardly into the filler neck and connected to the cover. A valve body having an upper and a lower chamber disposed therein is fitted into the housing and extends downwardly into the filler neck. The upper chamber and lower chamber have vent openings which cooperate with the opening in the cover to provide a vent path to allow the fuel tank to vent fuel vapor to the atmosphere. The lower chamber includes a floatation ball to seal one of the vent openings in the lower chamber to prevent fuel spillage when the vehicle is subjected to a bump, or is operated on a grade. The upper chamber includes a steel ball which seals one of the vent openings in the upper chamber to prevent fuel spillage when the vehicle is overturned to a substantially vertical position. Interposed between the upper and lower chambers is an upwardly biased plunger which, because of cooperation with the steel ball, extends into the lower chamber to prevent the floatation ball from sealing the vent opening in the lower chamber when the vehicle is in an upright position, and is operated normally. When the vehicle is subjected to a bump, or is operated on a grade, the steel ball rolls off of the upwardly biased plunger which allows the floatation ball to seal the vent opening in the lower chamber to prevent fuel spillage.

22 Claims, 3 Drawing Figures

VENTED FUEL CAP WITH BUMP AND GRADE SEAL

The present invention relates to a vented fuel tank cap for a vehicle having a roll-over safety feature. More particularly, the present invention relates to a vented fuel tank cap which combines a roll-over safety feature with a bump and grade spillage protection feature for installation on off-road vehicles, and certain sports vehicles.

Off-road vehicles, and certain sports vehicles generally have fuel tanks mounted such that the filler necks of the fuel tanks extend generally upwardly from the tank. Generally, such filler necks are short, with the fuel tank being located directly beneath the filler neck, under the hood of the vehicle. Because such vehicles generally either operate on rough, unimproved surfaces, such as agricultural fields, or, in the case of sports vehicles, are capable of generating high "g" forces during cornering, fuel spillage through the fuel cap is a potential problem. Such vehicles are also more susceptible to roll over than normally operated vehicles. It is therefore desirable to provide such vehicles with a fuel cap which prevents fuel spillage whenever the vehicle is subjected to a bump or is operating on a grade, or is subjected to high "g" forces, and also to prevent fuel spillage in the event that the vehicle rolls over to a substantially inverted position. It is further necessary for the fuel cap to allow the fuel tank to vent to the atmosphere during normal operation because of known problems with unvented fuel tanks.

The prior art discloses generally many different types of roll-over protected gas caps for use in the filler necks of vehicle fuel tanks. However, none of the prior art discloses a fuel cap which provides bump and grade spillage protection and roll-over protection, as well as a provision to allow the fuel tank to vent under normal conditions. The present invention, therefore, constitutes an improvement over the prior art in that it provides vapor release means for continuous venting of the fuel tank to the atmosphere combined with a roll-over safety feature and a bump and grade spillage protection feature.

One object of the present invention is to provide a cap for closing the filler neck of an off-road or sports vehicle which has means to prevent spillage of fuel when the vehicle is subjected to a bump or is operating on a steep grade.

Another object of the present invention is to provide a cap for closing the filler neck of an off-road or sports vehicle which provides continuous vapor release means so that the fuel tank of the vehicle is continuously vented to the atmosphere when the vehicle is being operated under normal conditions.

Yet another object of the present invention is to provide a cap for closing the filler neck of an off-road or sports vehicle which provides a roll-over safety feature to prevent spillage of fuel when the vehicle is in a substantially inverted position.

According to the present invention, a fuel tank cap is provided to seal the filler neck of an off-road or sports vehicle. The cap includes a cover portion having an opening therethrough and means providing a concentric housing extending downwardly into the filler neck and connected to the cover. The fuel cap also includes a valve body partially disposed in the concentric housing which extends downwardly into the filler neck, the valve body including an axially lower chamber and an axially upper chamber. The axially lower chamber has first vapor release means which communicates with second vapor release means in the axially upper chamber, which in turn communicates with the opening in the cover to allow the fuel vapor to vent to the atmosphere. The fuel cap further includes first means in the axially lower chamber to seal the first vapor release means when the vehicle is operated on a grade or is subjected to a bump, and second means in the axially upper chamber to seal the second vapor release means when the vehicle is in a substantially inverted position.

One feature of the present invention is that the fuel cap includes an axially lower chamber which has first vapor release means and first means to seal the vapor release means when the vehicle is operated on a steep grade, or is subjected to a bump, to prevent fuel from spilling out onto the vehicle through the first vapor release means. One advantage of the foregoing structure is that under normal conditions, the cap allows the fuel vapor to vent to the atmosphere, yet under abnormal conditions, such as when the vehicle is being operated on a grade or is subjected to a bump or high "g" force, the cap is completely sealed to prevent any fuel spillage. In the preferred embodiment, a floatation ball is disposed in the axially lower chamber to seal the first vapor release means when the vehicle is subjected to a bump or is operated on a grade, and a plunger is mounted to extend into the axially lower chamber to prevent the floatation ball from sealing the first vapor release means under normal conditions.

Another feature of the present invention is that the fuel cap further includes an axially upper chamber which has second vapor release means, and second means to seal the second vapor release means when the vehicle is turned over to a substantially inverted position. One advantage of the foregoing structure is that, again, under normal conditions, the cap allows the fuel vapor to vent to the atmosphere, yet under abnormal conditions, such as when the vehicle is turned over to a substantially inverted position, the fuel cap is completely sealed to prevent any fuel spillage. In the preferred embodiment, a ball constructed from steel, or a similar substance, is disposed in the axially upper chamber with the axially upper wall of the chamber being generally V-shaped, and the second vapor release means being centrally located in the bottom of the V-shaped wall. The steel ball is sized to fit into the V-shaped wall to seal the second vapor release means when the vehicle is turned over, and reaches a specified angle, to prevent any fuel from spilling out of the fuel tank.

Yet another feature of the present invention, as exemplified in the preferred embodiment, is that the plunger, which prevents the floatation ball from sealing the first vapor release means under normal conditions, is biased to an axially upper position, where the floatation ball will seal the first vapor release means, but is normally held in an axially lower position by the steel ball disposed in the axially upper chamber. One advantage of the foregoing structure is that the steel ball, which acts to seal the second vapor release means, serves a second function by cooperating with the plunger to control the floatation ball. This feature allows the fuel cap to function as described previously with fewer required internal parts than would normally be needed. The fuel cap is thus simple to construct, yet foolproof, in operation.

Additional objects, features, and advantages of the invention will become apparent to those skilled in the art upon consideration of the following detailed description of a preferred embodiment exemplifying the best mode of carrying out the invention as presently perceived. The detailed description particularly refers to the accompanying figures in which.

Figure 1:
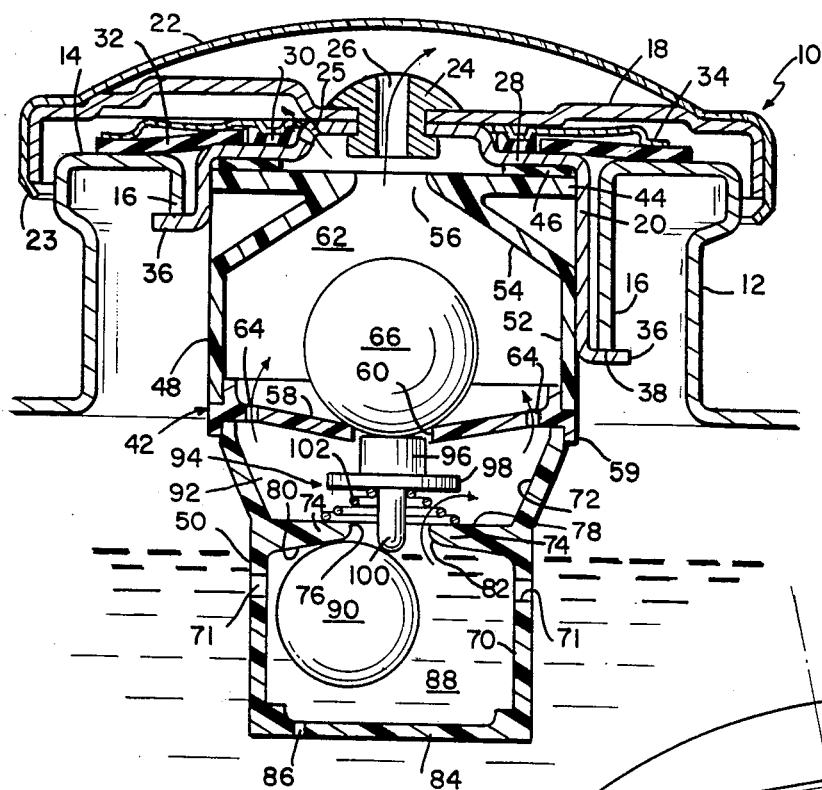
FIG. 1 is a transverse section through the fuel cap and filler neck of the present invention.

Referring now to the drawings, and particularly to FIG. 1, a fuel cap 10 is shown for closing a filler neck 12 of the type having a peripherally and radially extending, upwardly facing sealing surface 14 concentric with the axis of the neck and, at the radially inner edge of the sealing surface 14, a downwardly turned, peripherally extending flange 16 which has a cam profile edge which will be discussed later. The cap includes a cover 18 to which a cup 20 is rigidly fastened by a concentric rivet 24, the cup 20 being a downwardly opening, generally cylindrical cup. The rivet 24 is formed to include a centrally disposed, axially extending aperture 26 therethrough. A decorative cover 22 is disposed over the cover 18, and connected to the cover 18 by a turned-in portion 23. The cup 20 provides an upper shoulder 28 spaced axially apart from the cover 18 to define a space therebetween for an inner gasket 30, an outer gasket 32, and a diaphragm spring 34. The outer gasket 32 bears against both the shoulder 28 of the cup 20, and the sealing surface 14 of the filler neck 12, to provide a seal between the cup 20 and the filler neck 12. Both of the gaskets 30, 32 may be synthetic rubber gaskets, and the diaphragm spring 34 may be a stainless steel diaphragm spring for yieldably urging the outer peripheral edge of the outer gasket 32 axially downwardly. The cup 20 is formed with radially outwardly extending ears 36 which conventionally pass downwardly through notches in the sealing surface 14 and the flange 16 to engage a cam lock surface 38 defined by the distal edge of the flange 16. Twisting of the decorative cover 22 conventionally rotates the fuel cap 10 to move the cup 20 axially downwardly to press the outer gasket 32 axially downwardly against the sealing surface 14.

The cup 20 and a valve body 42 extending axially upwardly into the open end of the cup 20 comprise housing means connected to the cover 18 and extending axially downwardly into the filler neck 12 as discussed previously. The valve body 42 includes an upper, radially outwardly extending member 44 which captures a gasket 46 between its upper surface and the axially downwardly facing surface of the shoulder 28 of the cup 20. It will be understood that the gasket 46 is formed from material similar to gaskets 30, 32.

The valve body 42 is a generally cylindrical, hollow shell molded preferably from plastic. The valve body 42 is formed in two halves, having an axially upper portion 48 and an axially lower portion 50.

The axially upper portion 48 includes an upright side wall 52 which, at its upper edge, terminates in an axially upwardly extending, concentric reduced portion 54 which has a centrally disposed vent opening 56 formed therein. The vent opening 56 is in axial alignment with the aperture 26 of the rivet 24 to place the vent opening 56 in venting communication with the aperture 26. The upper portion 48 of the valve body 42 also includes a radially inwardly extending, slightly axially downwardly extending floor 58 having a centrally disposed opening 60 extending therethrough. The floor 58 includes a peripherally extending, axially downwardly turned flange 59, the purpose of which will be discussed later. The floor 58 further includes two vent openings 64 located substantially near the radially outer edge of the floor 58. The floor 58, side wall 52, and reduced portion 54, cooperate to define an axially upper chamber 62 in the axially upper portion 48 of the valve body 42. Disposed within the upper chamber 62 is a ball 66 which is formed from steel, or other suitable material, having a diameter greater than the diameter of the opening 60. It will be understood that because of the axially downward angle of the floor 58, the ball 66 is biased towards the center of the floor 58 by gravity when the fuel cap 10 is in a substantially upright position, thus causing the ball 66 to normally be seated in the opening 60 when the fuel cap is in the aforementioned position.

The axially lower portion 50 of the valve body 42 includes a generally upright sidewall 70 which, at its upper edge, terminates in an axially upwardly extending, radially outwardly extending, expanded portion 72. The sidewall 70 has two vent openings 71 extending therethrough. The upper edge of the expanded portion 72 is received by the flange 59 to join the upper portion 48 and the lower portion 50 to form the valve body 42. The lower portion 50 also includes a radially inwardly extending platform 74 having a centrally disposed opening 76 extending therethrough. The axially upwardly facing surface 78 of the platform 74 is generally flat. The axially downwardly facing surface 80 of the platform 74 extends radially inwardly and axially upwardly to form a downwardly facing concentric valve seat 82. The lower portion 50 further includes a generally planar floor 84 which has a drain opening 86. The sidewall 70, floor 84, and the downwardly facing surface 80 cooperate to define an axially lower chamber 88 in the axially lower portion 50 of the valve body 42. Disposed within this lower chamber 88 is a floatation ball 90 which is sized to seat in and seal the valve seat 82 under certain conditions which will be discussed later.

The expanded portion 72, the axially upwardly facing surface 78 of the platform 74, and the floor 58 of the upper portion 48 of the valve body 42 define a space 92. Disposed within this space 92 is a plunger 94. The plunger 94 has an axially upper cylindrical portion 96 which is sized to be slidingly received by the opening 60 in the floor 58 of the upper portion 48. The plunger 94 has a generally centrally disposed, radially outwardly extending, flange 98 having a diameter greater than the diameter of the opening 60 in the floor 58 of the upper portion 48. The flange 98 limits the axially upward travel of the plunger through the opening 60 into the upper chamber 62 of the upper portion 48. The plunger 94 also has an axially lower finger 100 having a diameter substantially smaller than the diameter of the opening 76 in the platform 74. The finger 100 extends through the opening 76 in the platform 74 and into the lower chamber 88 of the lower portion 50 under certain conditions, which will be discussed later.

The plunger 94 is movable between an axially upper position where the cylindrical portion 96 extends into the upper chamber 62, and, alternatively, an axially lower position where the finger 100 extends into the lower chamber 88. The plunger 94 is biased to the axially upper position by a tapered coil spring 102. The axially upper portion of the coil spring 102 is disposed about the finger 100 and acts against the axially lower surface of the flange 98 of the plunger 94 to bias the plunger 94 to the axially upper position. The axially lower portion of the coil spring 102 has a diameter larger than the opening 76 in the platform 74, and is positioned with its axis concentric with the opening 76 and rests upon the upper surface 78 of the platform 74.

In operation, the fuel cap 10 is installed in the filler neck 12 of a vehicle in a known manner so that the ears 36 of the fuel cap 10 engage the flange 16 of the filler neck 12. The outer gasket 32, which is biased axially downwardly by the diaphragm spring 34, contacts the sealing surface 14 to effect a seal between the fuel cap 10 and the filler neck 12.

Referring now to FIG. 1, which shows the fuel cap 10 and the filler neck 12 in a normal, upright position, it is desirable to let the vapor from the fuel in the vehicle fuel tank vent to the atmosphere. In the upper chamber 62, the ball 66 will be located over the opening 60 in the floor 58, and because of its weight, the ball 66 overcomes the biasing force of the coil spring 102 and forces the plunger 94 axially downwardly such that the upper surface of the cylindrical portion 96 of the plunger 94 is generally flush with the floor 58. This movement places the finger 100 of the plunger 94 through the opening 76 in the platform 74 to a position where the floatation ball 90 is displaced from the valve seat 82. It is understood that if the fuel level in the fuel tank is high enough to allow fuel to enter the lower chamber 88 through the vent openings 71 and drain opening 86, that the floatation ball 90 would normally float upwardly to seat in the valve seat 82. This would shut off the venting capability of the fuel cap 10 which, under normal conditions, is not desirable. With the floatation ball 90 displaced from the valve seat 82, fuel vapor is able to travel through the opening 76 in the platform 74, upwardly through the vent openings 64 in the floor 58, and then continue upwardly through the vent opening 56 and aperture 26 to the atmosphere. It will be appreciated that the path of travel of the fuel vapor from the tank, through the vent openings 71, through the opening 76, through the vent openings 64, through the vent opening 56, and through the aperture 26, to the atmosphere, collectively comprises a vapor release means for the fuel cap 10.

Figure 2:
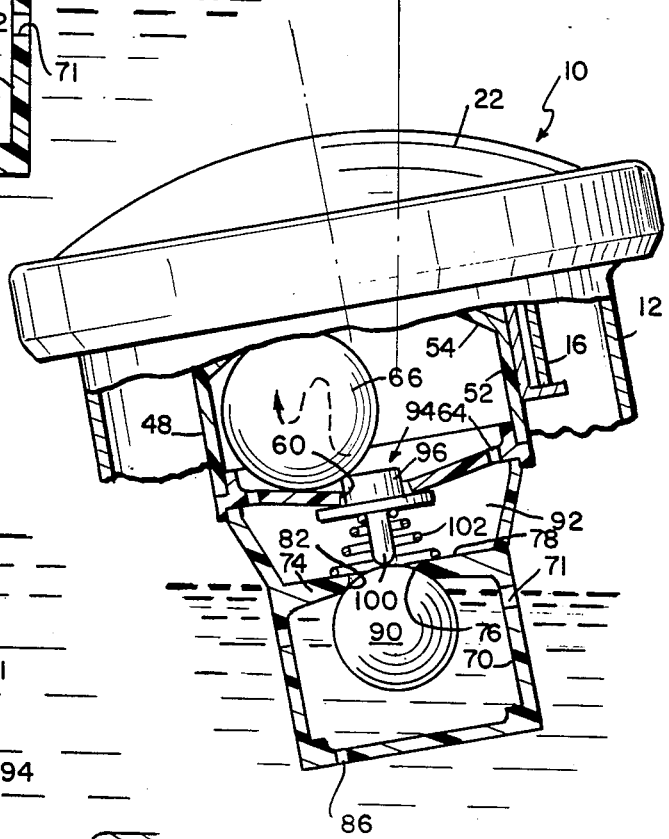
FIG. 2 is a partially broken away view of the fuel cap and filler neck assembly in a position displaced from the upright position.

It will be appreciated that there is a necessity to close this vapor release means whenever there is a possibility that fuel in the tank will spill or splash through the vapor release means because of an unusual attitude of the vehicle or if it is subjected to a bump or high "g" forces. Referring to FIG. 2, FIG. 2 shows the fuel cap 10 and filler neck 12 in a position immediately after the vehicle, which is being operated on a grade, has been subjected to a bump. The ball 66 has bounced off of the plunger 94 which has allowed the biasing force of the coil spring 102 to move the plunger 94 axially upwardly to its axially upper position. This movement of the plunger withdraws the finger 100 from the opening 76 of the platform 74 and allows the floatation ball 90 to float upwardly and seat in the valve seat 82 to close off the vapor release means. By sealing the vapor release means with the floatation ball 90, fuel which would have splashed upwardly through the vapor release means and spilled onto the vehicle is prevented from doing so. When the vehicle returns to a normal position, as shown in FIG. 1, the ball 66 will roll toward the opening 60 and force the plunger 94 to its axially lower position to cause the finger 100 to displace the floatation ball 90 from the valve seat 82, to again open the vapor release means as discussed in relation to FIG. 1.

Figure 3:
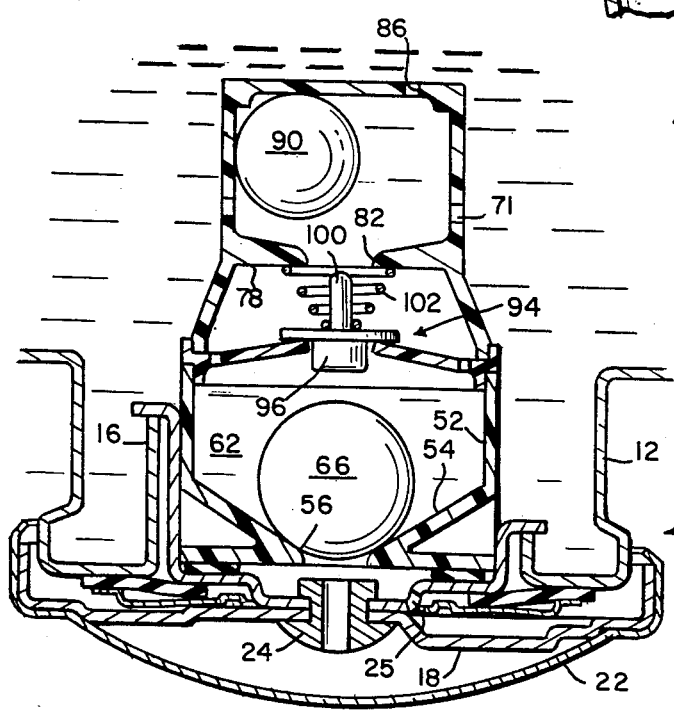
FIG. 3 is a view similar to FIG. 1, but with the fuel cap and filler neck assembly in an inverted position.

Referring now to FIG. 3, if the vehicle rolls to a substantially inverted position, it will be appreciated that the floatation ball 90 will no longer seal the valve seat 82. To prevent fuel from spilling out the vapor release means, the ball 66, being heavier than the fuel, will roll down the reduced portion 54 and seal the vent opening 56. This seals the vapor release means when the vehicle is in the substantially inverted position.

As can be seen from the above discussion, the fuel cap 10 of the present invention prevents fuel spillage when the vehicle is subjected to a bump, or high "g" forces, or is operated on a grade, and provides protection from fuel spillage when the vehicle is in a substantially inverted position, and yet allows fuel vapor to vent through a vapor release means when the vehicle is in a normal upright position and is operating under normal conditions.

Although the invention has been described in detail with reference to a preferred embodiment and specific examples, variations and modifications exist within the scope and spirit of the invention as described and defined in the following claims.

What is claimed is:

1. A cap for closing the filler neck of a vehicle fuel tank containing fuel, the fuel tank having a normally upwardly extending filler neck with a peripherally and radially extending, upwardly facing sealing surface concentric with the longitudinal axis of the neck, the cap comprising:
   a cover having an opening formed therethrough;
   means providing a concentric housing extending downwardly into said filler neck and connected to said cover;
   means providing a seal between said housing means and said sealing surface;
   a valve body partially disposed in said housing means and extending downwardly into said filler neck;
   said valve body including an axially lower chamber having an axially lower bottom wall and an axially upper top wall and an axially upper chamber having an axially lower bottom wall and an axially upper top wall, said axially lower chamber having first vapor release means and said axially upper chamber having second vapor release means in communication with the first vapor release means and with said fuel tank and said opening in said cover to provide communication between said fuel tank and the atmosphere;
   first means in said axially lower chamber for sealing said first vapor release means when said filler neck is tilted or subjected to a bump; and
   second means in said axially upper chamber for sealing said second vapor release means when said filler neck is in a substantially inverted position.

2. The cap of claim 1, wherein said vapor release means in said axially lower chamber comprises a centrally disposed first aperture in said axially upper top wall of said axially lower chamber.

3. The cap of claim 2, wherein said first sealing means comprises means to close said aperture in said axially upper wall of said axially lower chamber when said filler neck is tilted or subjected to a bump.

4. The cap of claim 3, wherein the closing means comprises a floatation ball which is lighter than said fuel contained in said fuel tank and will float in said fuel when said fuel is present in said axially lower chamber.

5. The cap of claim 4, further comprising means for preventing said floatation ball from sealing said aperture in said axially upper wall of said axially lower chamber when said filler neck is in an upright orientation.

6. The cap of claim 5, wherein the preventing means comprises a centrally disposed plunger which is axially movable between an axially upper position where the plunger is out of contact with said floatation ball to allow the floatation ball to seal said aperture when said filler neck is tilted or subjected to a bump and an axially lower position where the plunger is in contact with said floatation ball to prevent said floatation ball from sealing said aperture when said filler neck is in a substantially vertical orientation, and means for positioning said plunger between the axially upper position and the axially lower position.

7. The cap of claim 1, wherein said second vapor release means in said axially upper chamber comprises a centrally disposed second aperture in said axially upper top wall of said axially upper chamber.

8. The cap of claim 7, wherein said second sealing means comprises a ball of greater density than said fuel in said fuel tank, said ball sized to cooperate with said second aperture to seal said second vapor release means when said filler neck is in a substantially inverted position.

9. The cap of claim 8, wherein the positioning means comprises a spring to bias the plunger to said axially upper position and said ball disposed in said axially upper chamber to force the spring biased plunger to said axially lower position when said filler neck is in a substantially vertical orientation.

10. The apparatus of claim 9, wherein said bottom wall of said axially upper chamber is conically shaped and axially downwardly extending and formed to include a centrally disposed opening through which said plunger extends when said plunger is in the axially upper position, and wherein said ball disposed in said axially upper chamber cooperates with said conically shaped bottom wall of the axially upper chamber to engage said plunger when said filler neck is in a substantially vertical orientation to force said plunger to said axially lower position.

11. A cap for closing the filler neck of a vehicle fuel tank containing fuel, the fuel tank having a normally upwardly extending filler neck with a peripherally and radially extending, upwardly facing sealing surface concentric with the longitudinal axis of the neck, the cap comprising:

a cover having an opening formed therethrough;
a concentric housing that extends axially downwardly into said filler neck and connected to said cover;
a valve body partially disposed in said housing and extending downwardly into said filler neck, said valve body having an upper portion and a lower portion and having normally open vent means to normally allow venting communication between said fuel tank and the atmosphere when said cap is installed in said filler neck;
a first ball disposed in said lower portion of said valve body for sealing said vent means when said vehicle is tilted or subjected to a bump; and
a second ball disposed in said upper portion of said valve body for sealing said vent means when said vehicle is in a substantially inverted position and for normally preventing said first ball from sealing said vent means.

12. The cap of claim 11, wherein said first ball is a floatation ball that is lighter than said fuel in said fuel tank.

13. The cap of claim 12, wherein said second ball is heavier than said fuel in said fuel tank.

14. The cap of claim 13, further comprising a first upper chamber and a second lower chamber in said valve body, and wherein said first chamber includes an axially upper opening in communication with said cover opening and an axially lower opening, and said second chamber includes an axially upper opening in communication with said lower first chamber opening and at least one additional opening to place said second chamber in fluid and venting communication with said fuel tank.

15. The cap of claim 14, further comprising a plunger disposed between said lower first chamber opening and said upper second chamber opening and configured to be axially movable between a normal axially lower position where said plunger is in contact with said first ball to normally prevent said first ball from sealing said upper second chamber opening and an axially upper position where said plunger is out of contact with said first ball to permit said first ball to seal said upper second chamber opening when said vehicle is tilted or subjected to a bump.

16. The cap of claim 15, further comprising a spring configured to yieldably bias said plunger to said axially upper position.

17. The cap of claim 16, wherein said second ball is configured to normally be in contact with said plunger to override said spring biasing force to normally force said plunger to said axially lower position.

18. A cap for closing the filler neck of a vehicle fuel tank containing fuel, the fuel tank having a normally upwardly extending filler neck with a peripherally and radially extending, upwardly facing sealing surface concentric with the longitudinal axis of the neck, the cap comprising:

a cover having an opening formed therethrough;
means providing a concentric housing extending downwardly into said filler neck and connected to said cover;
a valve body partially disposed in said housing means and extending downwardly into said filler neck, said valve including an upper opening in venting communication with said opening in said cover and a lower opening in venting communication with said fuel tank;
a first ball disposed in said valve body and configured to seal said lower opening when said vehicle is tilted or subjected to a bump; and
a second ball disposed in said valve body above said first ball to seal said upper opening when said vehicle rolls over to a substantially inverted orientation and configured to hold said second ball away from said lower opening when said vehicle is upright and not subjected to a bump.

19. The cap of claim 18, wherein said first ball is lighter than said fuel contained in said fuel tank.

20. The cap of claim 18, wherein said second ball is heavier than said fuel contained in said tank.

21. The cap of claim 20, further comprising a plunger disposed above said lower opening and movable between a lower position where said plunger extends through said lower opening to displace said first ball from said lower opening and an upper position where said plunger is withdrawn from said lower opening to allow said first ball to seal said lower opening, and wherein said second ball cooperates with said plunger to maintain said plunger in the lower position when the vehicle is upright and not subjected to a bump.

22. The cap of claim 21, further comprising a spring to yieldably bias said plunger to the upper position.

* * * * *